(12) United States Patent (10) Patent No.: US 8,751,839 B2
Orr et al. (45) Date of Patent: *Jun. 10, 2014

(54) METHOD AND DEVICE FOR ACTIVATION OF COMPONENTS

(71) Applicant: Research In Motion Limited, Waterloo (CA)

(72) Inventors: Kevin Howard Orr, Waterloo, CA (US); Matthew Bells, Waterloo, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,905

(22) Filed: Dec. 11, 2012

(65) Prior Publication Data
US 2013/0103957 A1 Apr. 25, 2013

Related U.S. Application Data

(63) Continuation of application No. 12/814,123, filed on Jun. 11, 2010, now Pat. No. 8,335,938.

(51) Int. Cl.
*G06F 1/32* (2006.01)

(52) U.S. Cl.
USPC ............ 713/320; 713/300; 713/323; 713/324

(58) Field of Classification Search
USPC .................................. 713/300, 320, 323, 324
See application file for complete search history.

(56) References Cited

U.S. PATENT DOCUMENTS

| | | | |
|---|---|---|---|
| 5,799,256 A | 8/1998 | Pombo et al. | |
| 7,312,696 B2 | 12/2007 | Flick | |
| 7,689,850 B2 | 3/2010 | Cantwell et al. | |
| 8,335,938 B2 * | 12/2012 | Orr et al. ....................... | 713/320 |
| 2005/0275587 A1 | 12/2005 | Siegel et al. | |
| 2006/0156209 A1 | 7/2006 | Matsuura et al. | |
| 2006/0218029 A1 | 9/2006 | Chin | |
| 2007/0238440 A1 | 10/2007 | Sengupta et al. | |
| 2008/0005381 A1 | 1/2008 | Theocharous et al. | |

(Continued)

FOREIGN PATENT DOCUMENTS

EP 1662763 A1 5/2006
WO 2010034436 A1 4/2010

OTHER PUBLICATIONS

Gniady et al., Research Report, Program Counter Based Technologies for Dynamic Power Management, In Proceedings of the 10th International Symposium on High-Performance Computer Architecture (HPCA-10), Madrid, Spain, Feb. 14-18, 2004.

(Continued)

*Primary Examiner* — Glenn A Auve
(74) *Attorney, Agent, or Firm* — Ridout & Maybee LLP (57) ABSTRACT

A method and electronic device for activating components based on predicted device activity. The method and device include maintaining a set of device activity information storing data collected from components in the device. The device activity information may be maintained over a predetermined time period and may include times associated with the collected component data. The device activity information may include data regarding scheduled events. Device activity and the appropriate activation state of a component on the device may be predicted based on the current time, current data collected from components in the device and data in the device activity information.

24 Claims, 5 Drawing Sheets

(56) References Cited

U.S. PATENT DOCUMENTS

| | | | |
|---|---|---|---|
| 2008/0231449 | A1 | 9/2008 | Moshfeghi |
| 2009/0218957 | A1 | 9/2009 | Kraft et al. |
| 2009/0239508 | A1 | 9/2009 | Waddell |
| 2009/0259865 | A1 | 10/2009 | Sheynblat et al. |
| 2010/0191997 | A1 | 7/2010 | Dodeja et al. |
| 2012/0023355 | A1 | 1/2012 | Song et al. |

OTHER PUBLICATIONS

Aghera, Priti, Report entitled Context Aware Healthcare Application, Spring, 2009 pp. 1-4.

Ashraf, Khalil et al., "Improving Cell Phone Awareness by Using Calendar Information", Human-Computer Interaction—Interact 2005 Lecture Notes in Computer Science; LNCS, Jan. 1, 2005, pp. 588-600, Springer, Berlin, Germany.

Leichtenstern, Karin et al., "Analysis of Built-in Mobile Phone Sensors for Supporting Interactions with the Real World". Proceedings of the Workshop: Pervasive Mobile Interaction Devices (PERMID 2005). pp. 31-34, May 11, 2005.

Extended European Search Report issued Sep. 29, 2010 (11 pages) for related corresponding European Application No. 10165697.3-2221.

Palm, Inc., "Palm TX handheld user guide", 2005, Retrieved from the Internet: URL:http:palmone.r3h.net/downloads.palm.com/documentation/tx/tx_ug.pdf., retrieved on Mar. 1, 2011.

Examination Report for European Application No. 10165697.3 (Mar. 14, 2011).

Summons to Attend Oral Proceedings issued Aug. 23, 2011 (12 pages) for related corresponding European Application No. 10165697.3-2221.

Yi Wang et al. "A framework of energy efficient mobile Sensing for automatic user state recognition"; Proceedings of the 7th International Conference on Mobile Systems, Applications, and Services: Mobisys '09, Jan. 1, 2009; pp. 179-192; XP55017031, New York, USA DOI.

Ravi et al., Context-aware Battery Management for Mobile Phones: A Feasibility Study, Department of Computer Science, Rutgers University, USA, pp. 1-16, Mar. 2008.

* cited by examiner

| User Activity | Device Activity Time / Day | Accelerometer | Touchscreen Display 110 | GPS Subsystem 266 | IP Sub-system 260 | NFC Subsystem 268 | Additional Components |
|---|---|---|---|---|---|---|---|
| (sleep) | 11:00pm - 12:00am Monday | OFF | OFF | OFF | OFF | OFF | |
| (awake) | 7:00 am | ON sampling rate = 100 Hz range = +/-2g | STANDBY | | ON | | |
| | 7:15 am | OFF | | | | | |
| (leave) | 7:30 am | ON | | ON | | | |
| (transit) | 7:45 am 8:00 am | | | OFF | | | |
| (arrive at work) | 8:15 am 8:30 am | OFF | | ON OFF | | ON mode = 14443 - Type A OFF | |
| (meeting - new invites) | 8:45 am 9:00 am | | | ON Location = Z | | ON mode = vicinity access OFF | |
| | 9:15 am | | | | | ON mode = peer-to-peer OFF | |

FIG. 5

METHOD AND DEVICE FOR ACTIVATION OF COMPONENTS

CROSS-REFERENCE TO RELATED APPLICATIONS

The present application is a continuation of U.S. patent application Ser. No. 12/814,123 filed Jun. 11, 2010, which is owned in common herewith.

TECHNICAL FIELD

The present disclosure relates to a method, device and computer program product for managing the activation of components in an electronic device. The disclosure relates to electronic devices including but not limited to portable electronic devices having components for providing functions on the electronic device.

BACKGROUND

Electronic devices, including portable electronic devices, have gained widespread use and may include components for providing a variety of functions including, for example, telephonic, electronic messaging and other data manager (PDM) application functions, cellular, wireless 802.11 or Bluetooth™ capabilities, user interface and display functions. Components also may include sensors in the device which provide data about the environment, location or activity, of the device or a combination thereof. Electronic devices include, for example, several types of mobile stations such as simple cellular telephones, smart telephones, wireless personal digital assistants (PDAs) and laptop computers.

Components may be comprised of a dedicated or shared piece of hardware or circuitry within the electronic, a computer software program executed by the electronic device or a combination of hardware and software. Components may include, for example a touchscreen display; ambient light sensors; temperature sensors; tilt sensors accelerometers; altimeters; capacitive touch sensors; cameras; pedometers; force sensors to measure force on a display or input of the device; magnetometers to provide a compass heading and gyroscopes to measure angular velocity. Components also may include subsystems or modules in the device including, for example, global positioning systems (GPS) subsystems; cellular communications subsystems which, for example, may provide a cell area location of the device in a cellular network; internet protocol (IP) communications subsystems; short range communications subsystems; or near field communications (NFC) subsystems.

Power for electronic devices typically is provided by a device battery or a rechargeable power supply and thus is limited. Depending on the number and types of components in an electronic device, power consumption by components may be significant. Power consumption may be managed or limited by managing the activation of components. However, keeping components in a disabled or lower power state may disrupt the operation of the device and may cause delay in the performance of device functions. The delay may be noticeable to the user as components are changed from a disabled or low-power state to an enabled or higher power state.

BRIEF DESCRIPTION OF THE DRAWINGS

Like reference numerals are used in the drawings to denote like elements and features.

DETAILED DESCRIPTION OF EXAMPLE IMPLEMENTATIONS

The present disclosure provides a method and device for activating components based on predicted device activity. The method and device include maintaining a set of device activity information storing data collected from components in the device. The set of device activity information may be maintained over a predetermined time period and may include times associated with the collected component data. The set of device activity information also may include data regarding scheduled events. Device activity and the appropriate activation state of a component in the device may be predicted based on the current time, current data collected from components in the device and data in the set of device activity information.

According to one example implementation there is provided a method of generating predicted activation states of components in an electronic device, comprising: maintaining a set of device activity information in a memory, the set of device activity information including records of component data from one or more components in the electronic device at associated times; determining a current time; collecting current component data from the one or more components, the current component data being associated with the current time; predicting device activity based on the current component data and the device activity information record; and in response to the predicted device activity, generating a predicted activation state of at least one component in the electronic device.

According to another example implementation there is provided an electronic device comprising: a controller for controlling operation of the electronic device; a clock; a memory connected to the controller, for storing a set of device activity information, the set of device activity information including records of component data from one or more components in an electronic device at associated times; and the controller being configured to maintain the set of device activity information; determine a current time from the clock; collect current component data from the one or more components, the current component data being associated with the current time; predict device activity based on the current component data and the device activity information records; and in response to the predicted device activity, generate a predicted activation state of at least one component in the electronic device.

According to another example implementation of the present disclosure, there is provided a computer-readable storage medium in an electronic device having one or more components, the medium having stored thereon computer-readable and computer-executable instructions, which, when executed by a processor, cause the electronic device to perform actions comprising: maintaining a set of device activity information in a memory of the device, the set of device activity information including records of component data from one or more components in an electronic device at associated times; determining a current time; collecting current component data from the one or more components, the current component data being associated with the current time; predicting device activity based on the current component data and the device activity information record; and in response to the predicted device activity, generating a predicted activation state of at least one component in the electronic device.

According to another example implementation of the present disclosure, there is provided a method of generating predicted activation states of components in an electronic device, comprising: detecting a break from an established pattern of device activity based on current component data and device activity information records, the break comprising a change between a current device location and a device location in the device activity information records; predicting device activity based on the detected break from the established pattern of device activity; and in response to the predicted device activity, generating a predicted activation state of at least one component in the electronic device.

According to another example implementation of the present disclosure, there is provided an electronic device comprising: a controller for controlling operation of the electronic device; a clock; a plurality of components; a memory connected to the controller; and the controller being configured to detect a break from an established pattern of device activity based on current component data and device activity information records wherein the break comprises a change between a current device location and a device location in the device activity information records; predict device activity based on the detected break from the established pattern of device activity; and in response to the predicted device activity, generate a predicted activation state of at least one component in the electronic device.

According to another example implementation of the present disclosure, there is provided a non-transitory computer-readable storage medium in an electronic device having a plurality of components, the medium having stored thereon computer-readable and computer-executable instructions, which, when executed by a controller, cause the electronic device to perform actions comprising: detecting a break from an established pattern of device activity based on current component data and device activity information records, the break comprising a change between a current device location and a device location in the device activity information records; predicting device activity based on the detected break from the established pattern of device activity; and in response to the predicted device activity, generating a predicted activation state of at least one component in the electronic device.

Example implementations described below refer to an electronic device such as a cellular telephone or smartphone. It will be appreciated that the present disclosure is not limited to mobile devices and in some implementations may comprise a wired telephone device, or a personal computer or notebook.

Figure 1:
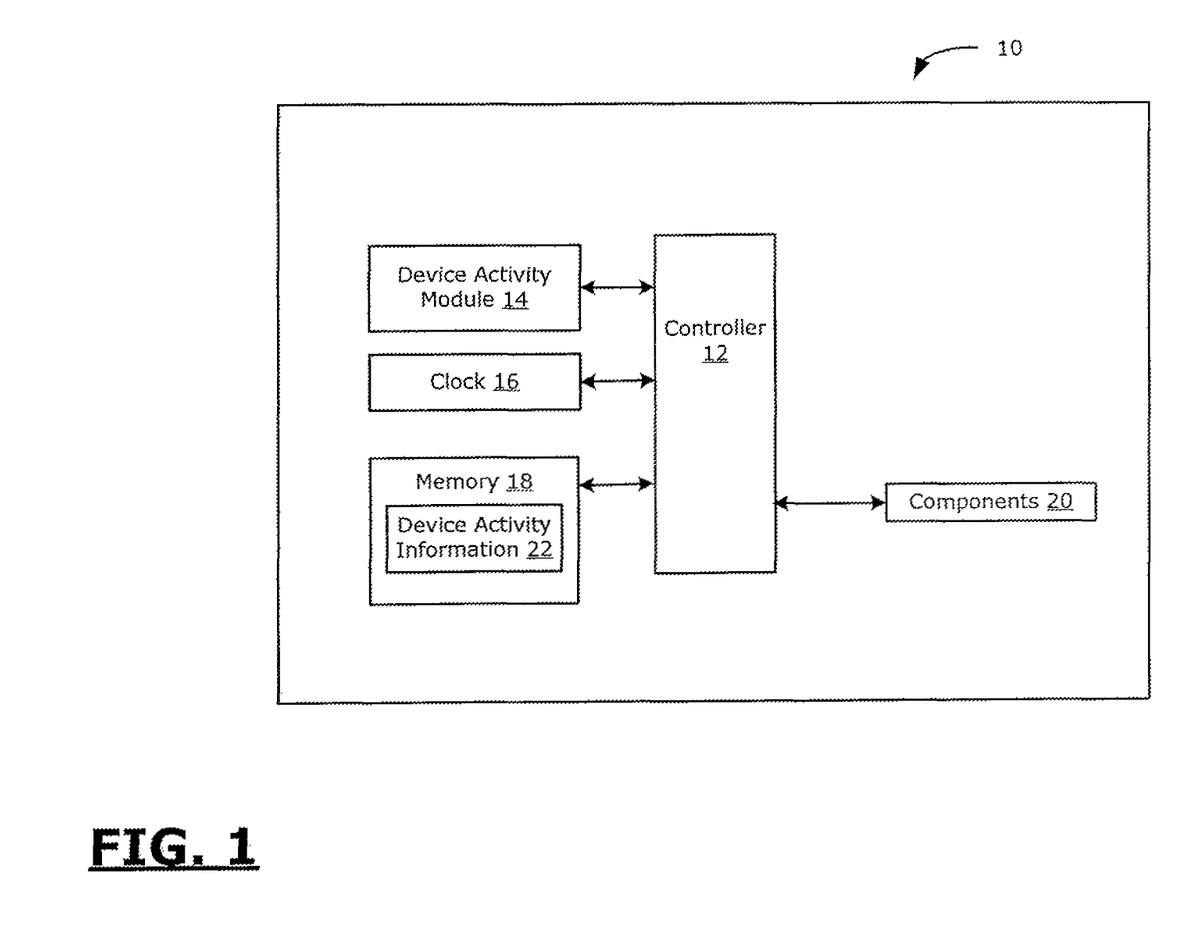
FIG. 1 is a block diagram illustrating an electronic device in accordance with one implementation of the present disclosure

FIG. 1 illustrates an electronic device 10 in which example implementations described in the present disclosure can be applied. Depending on the functionality provided by the electronic device 10, in various implementations, the device may be a multiple-mode communications device configured for both data and voice communication, a mobile communications device, a smartphone, a mobile telephone or a PDA (personal digital assistant) enabled for wireless communication. The electronic device 10 includes a controller 12 such as a microprocessor, which controls the overall operation of the electronic device 10. The controller 12 interacts with device components 20 including but not limited to subsystems and modules such as the device activity module 14, a clock 16, a memory 18 and one or more additional components 20.

Components 20 are comprised of a dedicated or shared piece of hardware or circuitry within the electronic device 10, a computer software program executed by the electronic device 10 or a combination of hardware and computer software. Components 20 may include subsystems, modules and sensors in the electronic device 10. A component 20 also may be comprised of a number of other components 20.

Data obtained from or about the components 20 may be stored in a set of device activity information, such as the set of device activity information 22 stored in the memory 18 of the device 10. The set of device activity information includes records of component data from one or more components 20 in the electronic device 10 at associated times.

The controller 12 is configured to maintain the set of device activity information, determine a current time from the clock. 16 and collect current component data from the one or more components 20, the current component data being associated with the current time. The controller 12 is configured to predict device activity based on the current component data and the device activity information record; and in response to the predicted device activity, generate a predicted activation state of at least one component 20 in the electronic device 10.

Figure 2:
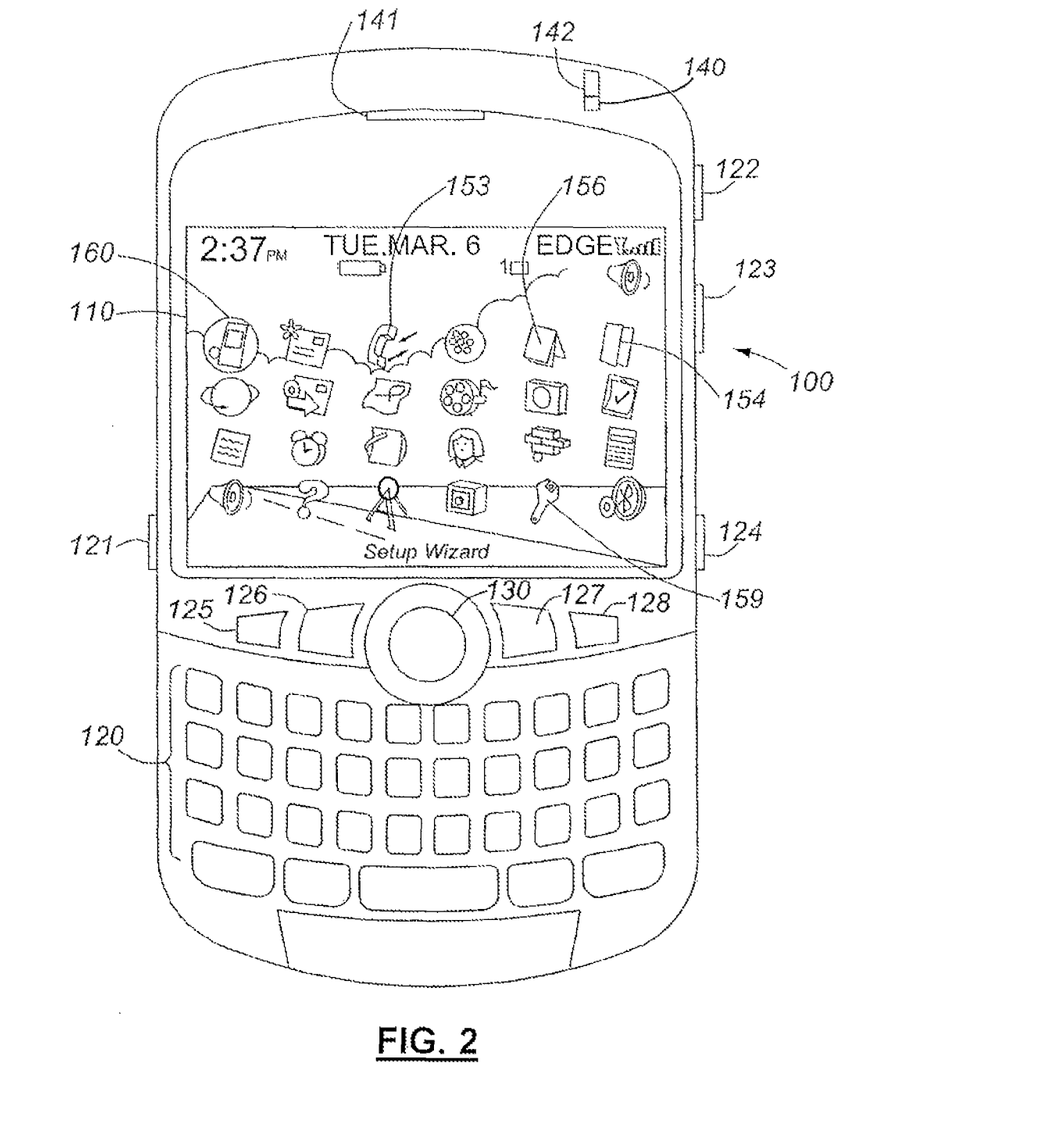
FIG. 2 is a graphical representation of a front view of an example of an electronic device.
Figure 3:
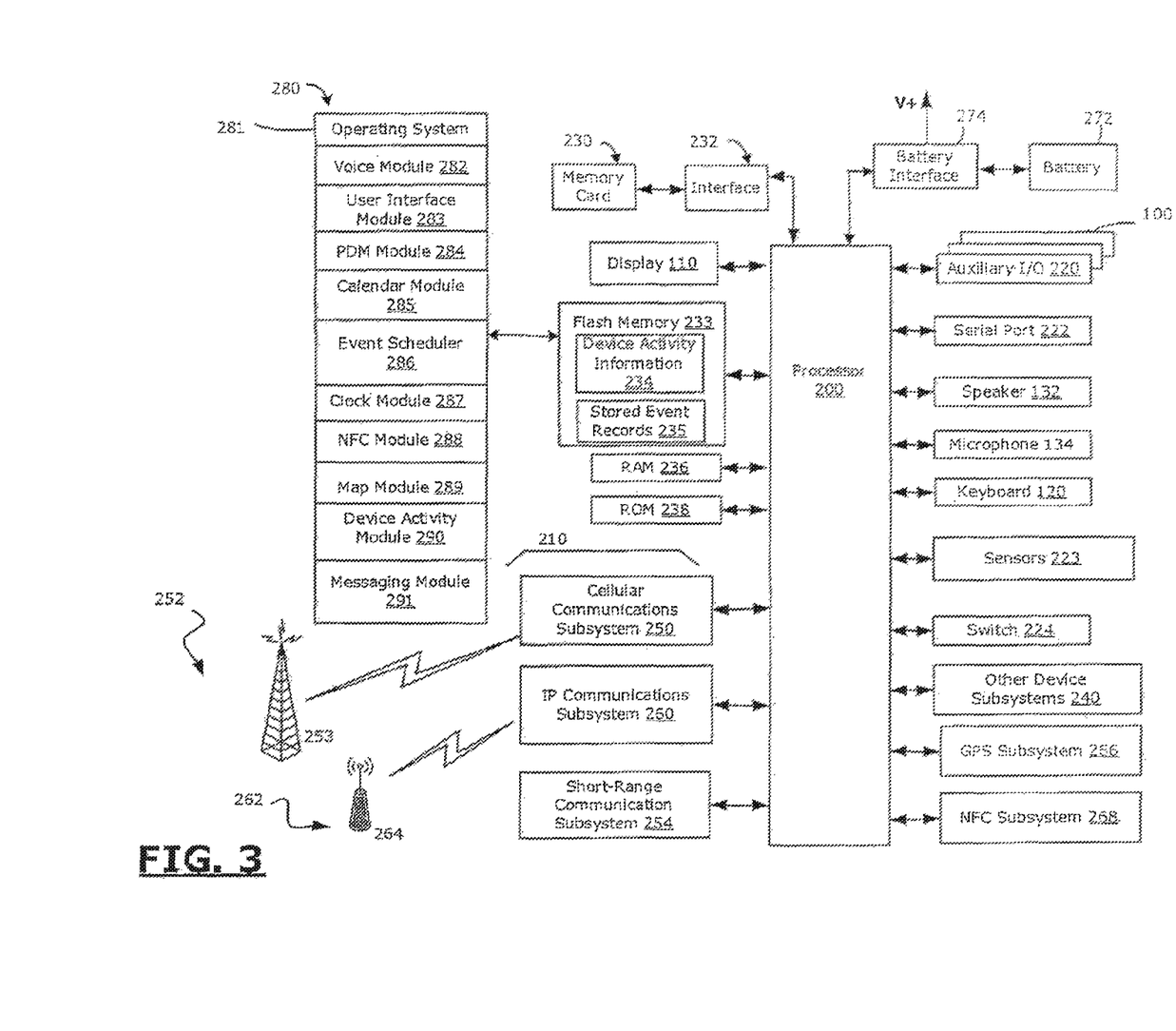
FIG. 3 is a block diagram illustrating an electronic device in accordance with one implementation of the present disclosure.

FIGS. 2 and 3 illustrate one implementation of an electronic device 100 in which example implementations described in the present disclosure can be applied. The electronic device 100 shown in FIG. 2 is an exemplary embodiment of the electronic device 10 described with reference to FIG. 1. A graphical representation of a front view of an example of an electronic device 100 is illustrated in FIG. 2. Depending on the functionality provided by the electronic device 100, in various implementations the device may be a multiple-mode communications device configured for both data and voice communication, a smartphone, a mobile telephone or a PDA (personal digital assistant) enabled for voice communication.

The electronic device 100 includes components 20 such as a display screen 110, an alphanumeric keyboard or keypad 120; optionally one or more non-keyboard inputs, such as buttons 121-128 which may be navigational, function, exit or escape keys which may be inwardly depressed to provide further input function; or a rotatable input device such as a trackball 130 or scrollwheel or trackwheel (not shown). In some implementations, the keys in the keyboard 220 may not be actual physical keys but may be virtual keys displayed on a touch sensitive area (not shown) within the display screen 110.

The electronic device 100 includes components 20 such as a speaker 132, a microphone 134, a visible indicator 136, an ambient light sensor 140 and a plurality of user selectable icons shown on the display screen 110. The icons are each associated with functions that can be performed by the electronic device 100. For example, FIG. 2 shows a "Phone" icon 160 for accessing telephone functionality (associated with voice module 282), an "Address Book" icon 162 for accessing address book functions (associated with address book module), a "Calendar" icon 164 for accessing calendar functions (associated with a calendar module 285) and an options icon 166 (associated with an options module, which may be a separate module or executed by one or more existing modules). An icon is shown highlighted or focused by a caret or selection symbol (not shown) which can be navigated by a device user among the displayed icons through manipulation of the trackball 130 (or other navigational input device). The trackball 130 is also depressible, such that depression of the trackball 130 when an icon is highlighted or focused by selection symbol 160 results in the launch of functions of the associated module.

Referring to FIG. 3, the electronic device 100 includes a controller comprising at least one processor 200 such as a microprocessor which controls the overall operation of the electronic device 100. The microprocessor 200 interacts with components 20 including communications subsystems shown generally at 210 and with further device components 20 such as display 110; one or more auxiliary input/output (I/O) subsystems or devices 220; a serial port 222 such as a Universal Serial Bus (USB) data port; a speaker 132; a microphone 134; keyboard or keypad 120; a switch 224; a removable memory card 230 and interface 232; flash memory 233; random access memory (RAM) 236; read only memory (ROM) 238; and other device subsystems generally designated as 240. Some of the subsystems shown in FIG. 3 perform communication-related functions, whereas other subsystems may provide "resident" or on-device functions.

The particular design of the communications subsystems 210 depends on the network(s) in which the electronic device 100 is intended to operate. For example, the communication subsystem 250 of the electronic device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the electronic device 100.

The electronic device 100 may include a cellular communications subsystem 250 including a receiver, a transmitter, and associated components 20 such as one or more antenna elements, and a processing module such as a digital signal processor (DSP) for exchanging signals with a wireless network 252 through a base station 253. The electronic device 100 may send and receive communication signals over the wireless network 252 after network registration or activation procedures have been completed. The wireless network 252 may comprise a public land mobile network (PLMN). The electronic device 100 may be capable of both wireless voice and data communications via the wireless network 252.

The electronic device 100 may include an Internet protocol (IP) communications subsystem 260 for communication with an IP network 262 such as a wireless local area network (WAN) through a wireless access point 264. The wireless access point 264 may be configured in accordance with one of the IEEE 802.11 specifications. The electronic device 100 may be equipped with a suitable antenna, RF transceiver, and software for accessing and using the WLAN connectivity of the wireless access point 264.

The electronic device 100 may include a short-range communication subsystem 254 for communication between the electronic device 100 and different systems or devices, which need not necessarily be similar devices. For example, the subsystem 254 may include an infrared device and associated circuits, or a wireless bus protocol compliant communication mechanism such as a Bluetooth® communication module to provide for communication with similarly-enabled systems and devices, such as a smart card reader (not shown).

The electronic device 100 may include a near field communications (NFC) subsystem 268 for communications between the electronic device 100 and another NFC-enabled device, which need not necessarily be a similar device. The "Near Field Communications Interface and Protocol" or "NFCIP-1" or "the NFC protocol", is a short-range, high frequency communication protocol that allows for communication between an Initiator device and a Target device when the Initiator device and the Target device are brought close together. The NFC protocol operates within the globally available and unregulated radio frequency band of 13.56 MHz and has a working distance of up to 20 centimetres. Three data rates are available: 106 kilobits per second (kbit/s); 212 kbit/s; and 424 kbit/s.

Two communication modes of NFC are currently available: a Passive communication mode; and an Active communication mode. In the Passive communication mode, the Initiator device provides an electro-magnetic carrier field and the Target device answers the Initiator device by modulating the carrier field. In the Passive communication mode, only the Initiator device is required to have a power supply; the Target device may draw operating power from the carrier field provided by the Initiator device. In the Active communication mode, both the initiator device and the Target device generate their own electro-magnetic field. The Initiator device starts the NFC communication. The Target device responds to a command received from the Initiator device in the Active communication mode by modulating the electro-magnetic field generated by the Target device. Typically, in the Active communication mode, both devices need to have a power supply. In the Active communication mode, both devices can act as either an Initiator or as a Target whereas in the Passive communication mode, the device without the ability to create an electro-magnetic carrier field cannot be an Initiator device. The electronic device 100 may act as an initiator or as a Target device.

The electronic device 100 may support various NFC operation modes through the NFC subsystem 268 and the NFC module 288, including card emulation mode, peer to peer mode and reader/writer mode. For example, in card emulation mode, the electronic device 100 may function as a security device which is authenticated via NFC communications with a reader controlling access, for example, to a room or building. Access control applications typically are implemented in a "vicinity coupled" NFC mode having a range of up to one metre. In card emulation mode, the electronic device 100 also may support financial transactions between the electronic device 100 and a point of sale device enabled for NFC communications. Financial transactions typically are implemented in a "proximity coupled" NFC mode having a range of less than 10 centimetres. In peer to peer mode, the electronic device 100 may exchange data, such as contact data or an electronic business card with another NFC enabled device. In reader/writer mode the electronic device 100 may act like a contactless card reader in which the electronic device 100 may read a tag associated with a sign or poster, in order to obtain data about an event or location advertised by the sign.

The electronic device 100 may include a global positioning system (GPS) subsystem 266 which may provide mapping or location positioning capability. While the American Global Positioning System (GPS) is referenced, methods and apparatus described in this disclosure may equally be used in conjunction with other types of global or regional navigation satellite systems, including but not limited to the European Galileo, Russian GLONASS and Chinese Beidou Compass systems.

The electronic device 100 also includes a battery 272 as a power source, which is typically one or more rechargeable batteries that may be charged, for example, through charging circuitry coupled to a battery interface such as the serial data port 222. The battery 272 provides electrical power to at least some of the electrical circuitry in the electronic device 100 including sensors 223 and subsystems in the electronic device 100. The battery interface 274 provides a mechanical and electrical connection for the battery 272. The battery interface 274 is coupled to a regulator (not shown) which provides power V+ to the circuitry of the electronic device 100.

The processor 200 operates under stored program control and executes software modules 280 stored in memory such as persistent memory, for example, in the flash memory 233. The software modules 280 comprise operating system software 281 and may include a range of application modules, including, a voice communication module 282, a user interface module 283, a data manager module 284, a calendar module 285, an events scheduler 286, a clock module 287, a near field communications (NFC) module 288, a map module 289, a device activity module 290 and a messaging module 291. The software modules may include an address book module, an email module, a web browser module, a notepad module, a push content viewing module, and a media player module (not shown). The software modules 280 may among other things, each be implemented through stand-alone software modules, or combined together in one or more of the operating system 281 or one or more of the other software modules 280. In some implementations, the functions performed by each of the above identified modules may be realized as a plurality of independent elements, rather than a single integrated element, and any one or more of these elements may be implemented as parts of other software modules.

The user interface (UI) module 283 renders and displays a graphical user interface (GUI) on a display 110 of the electronic device 100 in accordance with instructions of the operating system 281 and modules 280 (as applicable). The GUI allows interaction with and control over the operation of the electronic device 100. The GUI may be displayed on the display 110 which may be a touchscreen display. The GUI is rendered prior to display by the operating system 281 or a software module 280 which causes the processor 200 to display content on the display 110.

The calendar module 285 or the events scheduler 286, or both the calendar module 285 or the events scheduler 286 facilitate a user entering or scheduling events and setting reminders in relation to calendar events. A database, such as stored event records 235, adapted to store event data corresponding to entered event details can be maintained on the flash memory 233, the RAM 236 or some other computer readable medium such as a remotely located magnetic/optical-based disk drive, for example. The stored event records 235 may comprise a separate database or may be included as part of a set of device activity information 234 as described below. The calendar module 285 is able to add, alter and delete event data in this database by way of action queries, for example.

The event scheduler 286 permits a user of the electronic device 100 to set up or schedule a future event or event request with other users having communication devices. The event scheduler 286 may be implemented as part of an electronic messaging application, such as the messaging module 291 or as part of a general event scheduling module, such as the calendar module 285. Alternatively, the event scheduler 286 may be implemented as an independent application that communicates with an electronic messaging module 291 or a general event scheduling module or with both an electronic messaging module 291 and a general event scheduling module. The messaging module 291 enables the electronic device 100 to send and receive messages, such as email messages, over a communication network, through the communication subsystem 210.

The use of calendar modules 285 and messaging modules 291 on PDA-type devices and personal computers to schedule appointments, meetings and the like is common place. The term "message" is used to designate any type of electronic message such as an email (which may include a thread of emails), text or SMS message, instant message, etc. The term "event" is used to designate any type of event, such as an appointment a meeting, a conference call, a scheduled task, etc.

The software modules 280 or parts thereof may be temporarily loaded into volatile memory such as the RAM 236. The RAM 236 is used for storing runtime data variables and other types of data, as will be apparent to those skilled in the art. Although specific functions are described for various types of memory, this is merely an example, and those skilled in the art will appreciate that a different assignment of functions to types of memory could also be used.

In sonic implementations, the auxiliary input/output (I/O) subsystems 220 may comprise an external communication link or interface, for example, an Ethernet connection. The electronic device 100 may comprise other wireless communication interfaces for communicating with other types of wireless networks, for example, a wireless network such as an orthogonal frequency division multiplexed (OFDM) network or a GPS transceiver or communicating with a GPS satellite network (not shown). The auxiliary I/O subsystems 220 may comprise a vibrator for providing vibratory notifications in response to various events on the electronic device 100 such as receipt of an electronic communication or incoming phone call, or for other purposes such as haptic feedback (touch feedback).

In some implementations, the electronic device 100 also includes a removable memory card 230 (typically comprising flash memory) and a memory card interface 232. Network access typically is associated with a subscriber or user of the electronic device 100 via the memory card 230, which may be a Subscriber Identity Module (SIM) card for use in a GSM network or other type of memory card for use in the relevant wireless network type. The memory card 230 is inserted in or connected to the memory card interface 232 of the electronic device 100 in order to operate in conjunction with the wireless network 252.

The electronic device 100 stores data in an erasable persistent memory, which in one example implementation is the flash memory 233. In various implementations, the data includes service data comprising data used by the electronic device 100 to establish and maintain communication with the wireless network 252. The data may also include user application data such as one or more sets of device activity information 234 and event records 235 as well as email messages, address book and contact data, calendar data, notepad documents, image files, and other commonly stored user data stored on the electronic device 100 by its user, and other data. The data stored in the persistent memory (e.g. flash memory 233) of the electronic device 100 may be organized, at least partially, into a number of databases each containing data items of the same data type or associated with the same application. For example, sets of device activity information 234, email messages, contact records, and task items may be stored in individual databases within the device memory. Content protection measures may be applied to one or more data items or databases thin the device memory.

The serial data port 222 may be used for synchronization with a user's host computer system (not shown). The serial data port 222 enables a user to set preferences through an external device or software module and extends the capabilities of the electronic device 100 by providing for data or software downloads to the electronic device 100 other than through the wireless network 252. The alternate download path may, for example, be used to load an encryption key onto the electronic device 100 through a direct, reliable and trusted connection to thereby provide secure device communication.

A predetermined set of applications that control basic device operations, including data and voice communication applications normally will be installed on the electronic device 100 during or after manufacture. Additional applications, upgrades to the operating system 281 or software modules 280 may also be loaded onto the electronic device 100 through the wireless network 252, the auxiliary I/O subsystem 220, the serial port 222, the short-range communication subsystem 270, or other suitable subsystems or other wireless communication interfaces. The downloaded programs or code modules may be permanently installed, for example, written into the program memory (i.e. the flash memory 233), or written into and executed from the RAM 236 for execution by the processor 200 at runtime. Such flexibility in application installation increases the functionality of the electronic device 100 and may provide enhanced on-device functions, communication-related functions, or both.

The electronic device 100 may include a personal data manager (PDM) module 284 having the ability to organize and manage data items relating to a user such as, but not limited to, instant messaging, email, calendar events, voice mails, appointments and task items. The PDM module 284 has the ability to send and receive data items via the wireless network 252. In some example implementations, PDM data items are seamlessly combined, synchronized, and updated via the wireless network 252, with the user's corresponding data items stored or associated with the user's host computer system, or both, thereby creating a mirrored host computer with respect to these data items.

The electronic device 100 may provide two principal modes of communication: a data communication mode and a voice communication mode. In the data communication mode, a received data signal such as a text message, an email message, or web page download will be processed by the communication subsystem 250, 260 and input to the processor 200 for further processing and output on the display 110 or alternatively to an auxiliary I/O device 220. A user of the electronic device 100 also may compose data items, such as email messages and calendar entries, for example, using the keyboard 220 in conjunction with the display 110 and possibly the control buttons 221-228 or the auxiliary I/O subsystems 220. These composed items may be transmitted through the communication subsystems 250 and 260 over the respective wireless networks 212 and 213.

In the voice communication mod the electronic device 100 provides telephony functions and operates as a typical cellular phone or as a VoIP phone. Received signals are output to the speaker 132 and signals for transmission would be generated by a transducer such as the microphone 134. The telephony functions are provided by a combination of software/firmware (i.e., the voice communication module 282) and hardware (i.e., the microphone 134, the speaker 132 and input devices). Alternative voice or audio I/O subsystems, such as a voice message recording subsystem, also may be implemented on the electronic device 100. Although voice or audio signal output is typically accomplished primarily through the speaker 132, the display 110 may also be used to provide an indication of the identity of a calling party, duration of a voice call, or other voice call related data.

Components 20 in the electronic device 100 include but are not limited to a number of sensors shown generally at 223 which provide data about the environment, location or activity, or a combination thereof, of the electronic device 100. Exemplary sensors may include but are not limited to one or more of an ambient light sensor 140; a temperature sensor or thermometer to provide a measurement of the environment of the electronic device 100; a tilt sensor configured to provide an indication of the current tilt angle of the electronic device 100; an accelerometer; an altimeter or pressure sensor to provide an indication of barometric pressure of the environment of the electronic device 100 which may be used by weather related modules in the electronic device 100 or to provide altitude resolution to assist the GPS subsystem 266 or to assist with navigation modules; a capacitive touch sensor; a pedometer; a force sensor to measure force on a display or input of the electronic device 100; a magnetometer to provide a compass heading; and a gyroscope to provide a measurement of the angular velocity of the electronic device 100. Sensors may include subsystems which also provide data about the environment, location or activity, or a combination thereof, of the electronic device 100, such as the GPS subsystem 266, the cellular communications subsystem 250, the IP communications subsystem 260, the short range communications subsystem 254 and the NFC subsystem 268.

Each component 20 in the electronic device 10 or 100 may have one or more activation states determined and set by the electronic device 10 or 100 to support functions being performed by the electronic device 10 or 100 or according to input received from a user of the electronic device 10 or 100. In the one or more activation states, the functions and data or quality of data provided by the component 20 and the power used by the component 20 vary. In one implementation, in an enabled activation state, the component 20 is activated and fully operational, requiring a significant power supply. In an idle activation state, the component 20 is operable, but with limited functions and at a lower power level. In a standby, sleep activation state, the component 20 is not operational and is at a minimal power level, but may be quickly enabled and functional when transitioned out of the standby activation state to the idle or enabled activation state. The component 20 also may be in a disabled activation state and thus drawing no power if its functions or the data provided by the component 20 are not in use by the electronic device 10 or 100. Power also may be used by the component 20 in changing activation states. It will be understood that the types and numbers of activation states for the component 20, the functions performed and data provided by the component 20 in a particular activation state, and the power required in each activation state vary depending on the component 20. For example, a component 20 may be in an activation state in which the component 20 is fully enabled but power cycled and operating at a reduced power, such as an accelerometer operating at a lower sampling rate. A component 20 may be in an activation state in which lower power is required and in which only limited communication functions may be performed by the component 20.

Additionally, components 20 may operate according to one or more attribute settings which may be stored in the electronic device 10 or 100 or determined and generated by the electronic device 10 or 100. Alternatively, or additionally, the electronic device 10 or 100 may prompt a user to enter or select an attribute setting depending on the data or functions requested from the component 20. Examples of component attributes include but are not limited to a sampling rate of the accelerometer, such as high, medium or low (or 3.2 KHz, 1.5 KHz, 100 Hz) or the range of the accelerometer such as +/−2 g, 4 g, 8 g or 16 g; an RF protocol type for the NFC communications subsystem 268; a temperature scale or precision of the thermometer; or an update rate of the GPS subsystem 266 such as 1 second, 8 seconds etc.

The activation states and attribute settings of components 20 are changed according to requirements of the electronic device 10 or 100 and functions being performed by the electronic device 10 or 100. Activation states and attribute settings also may be changed based on input from a user received at the electronic device 100 through a user interface such as the display 110, keypad 120 or microphone 134. For example, a user may activate a temperature sensor in the electronic device 100 when the user exits a building in order to measure an outside temperature. A user may activate the GPS subsystem 266 in order to determine a current location and to use the map module 289 for navigation. A user may activate the IP communications subsystem 260 when arriving at the user's home in order to access a home network access point 264.

Each component 20 also may include an operational status which indicates the status of the component 20. The operational status may indicate a number of different states or conditions of the component 20, including the status of the component 20 as a change in the activation state, changes in attribute settings or a combination of a change in activation states and changes in attribute settings are implemented. The operational status may correspond to the activation state set by the electronic device 10 or 100 or according to input received from a user. Alternatively, the operational status may, for example, indicate a component 20 is in a disabled state and is unable to operate despite a request to set the activation state to an enabled activation state. The operational status of the component 20 may provide additional data regarding the operation of the component 20 and the environment, location or activity, or a combination thereof, of the electronic device 10 or 100.

Latency exists between changes in activation states and between the setting of an activation state and the component 20 having an operational status corresponding to the activation state. Latency exists in particular if a component 20 is changed from a disabled activation state to an enabled activation state. Latency also may arise in the operation of a component 20 due to changes in attribute settings for the component. Changes in attribute settings for the components 20 may occur at the same time as a change in activation state or independently from a change in activation state. In one implementation, changes in attribute settings are not determined by the electronic device 10 or 100 until the component 20 is enabled. Alternatively, changes in attribute settings may occur in response to input received from a user through a user interface such as the display 110, keypad 120 or microphone 134. The latency resulting from changes in activation states, changes in attribute settings or a combination of changes in activation states and changes in attribute settings may or may not be noticeable to a user of the electronic device 10 or 100.

In some implementations, in order to manage power consumption in the electronic device 10 or 100, data from components 20, including activation states and operational status, is collected and analyzed to establish one or more patterns of device activity. Based on the patterns of device activity, the activation states of components 20 are predicted and are set automatically in anticipation of the predicted activity of the electronic device 10 or 100. In some implementations, the predicted device activity is based on data for events scheduled to occur at future time and date, such as event data in the set of device activity information 234 or event data from the stored event records 235 or event data from the calendar module 285, or a combination thereof. The activation states of components 20 which are not predicted to be used in the electronic device 10 or 100 may be set to a disabled, standby or idle activation state in order to conserve power. Components 20 which are predicted to be used or which are predicted to provide data of use to the electronic device 100 and to the user may be set to a standby, idle or enabled activation state. The predicted device activity may be based on detected breaks from the pattern of device activity.

Thus, if a component 20 is predicted to be used by the electronic device 10 or 100, a predicted activation state and attribute settings are generated and the activation state of the component 20 is set to the predicted activation state and attribute settings prior to the predicted activity. The power required by the component 20 for the activation state varies depending on the component 20. If the component is predicted not to be in use, it is set to any of the activation states applicable for the component 20, such as an activation state that requires a lower level of power or an activation state that requires a lower level of power in light of the next predicted activity for the component 20. For example, a component 20 may be put in standby activation state rather than a fully disabled activation state if the pattern of device activity shows the component 20 will be used within a period of time such that cycling through activation states, which may require additional power, is avoided.

Figure 4:
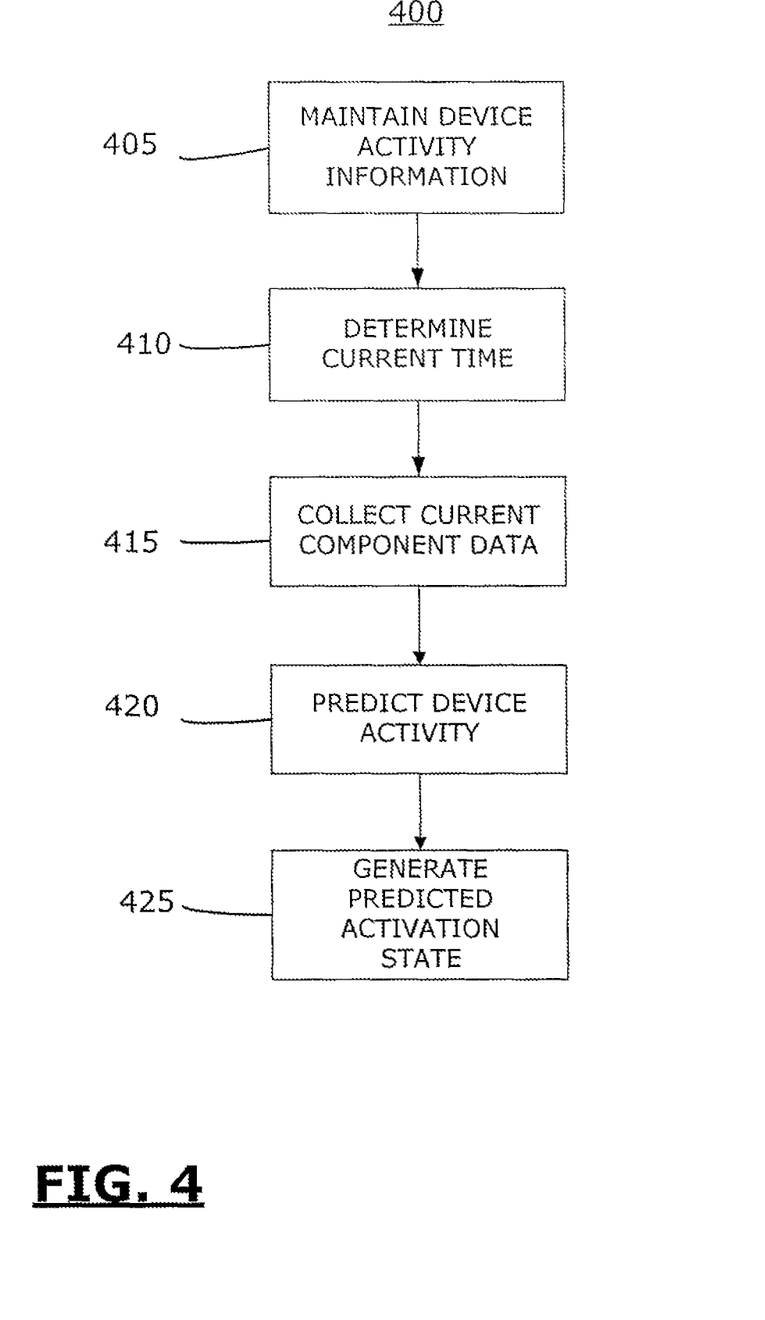
FIG. 4 illustrates a flowchart of a method described in the present application.

FIG. 4 illustrates an example implementation of a method 400 for generating predicted activation states of components 20 in the electronic device 10 or 100. At action 405, set of device activity information 22 or 234 is maintained in a memory 18 or 233 to store records of component data from one or more components 20 in the electronic device 10 or 100, the component data providing data about device activity at associated times. At action 410 a current time is determined. At action 415 current component data is collected and associated with the current time. At action 420, device activity is predicted based on the current component data and one or more records in the set of device activity information. At action 425, in response to the predicted device activity, a predicted activation state of at least one component 20 in the electronic device 10 or 100 is generated. The method 400 is described in further detail below.

Initially, at action 405, a set of device activity information 22 or 234 is maintained. Patterns of device activity vary according to one or more routines of a user of the electronic device 10 or 100 including a weekly work routine or a weekly vacation routine. Thus, one or more sets of device activity information 22 or 234 are maintained to establish one or more patterns of device activity based on routines of the user of the device. The set of device activity information 22 or 234 may be generated by the device activity module 14 or 290 or by the processor 200 and may be stored in persistent memory, such as flash memory 233 in the electronic device 100.

Figure 5:
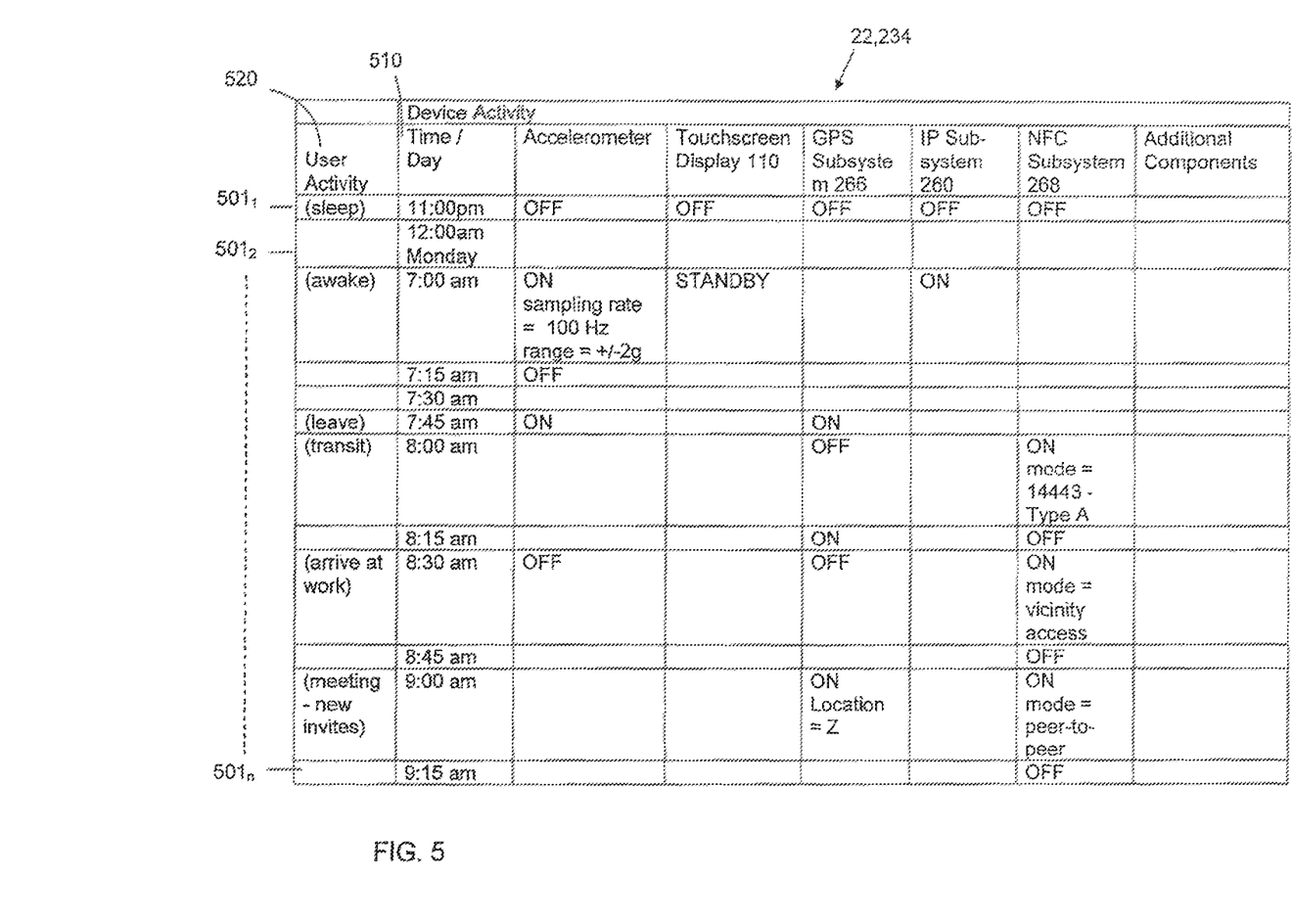
FIG. 5 is a diagram illustrating a set of device activity information in accordance with one implementation of the present disclosure.

A sample set of device activity information 22 or 234 is illustrated in FIG. 5. In one embodiment, the set of device activity information 234 is organized as a table as illustrated in FIG. 5. The set of device activity information 22 or 234 includes data learned about past device activity in the form of records $501_1$ to $501_n$ of component data from one or more components 20 in the electronic device 10 or 100. The device activity information records 501 may include a time 510 associated and stored with the component data. In one implementation, the device activity information records include a time of day and day of the week along with the component data. The associated times may be recorded in seconds, minutes or hours, or a combination of thereof, or may include a range of times. In one implementation, the set of device activity information 234 includes data regarding scheduled events such as, but not limited to, event data obtained from the calendar module 285, the event scheduler 285 or the event records 235, of a scheduled time and a scheduled location of a future appointment, meeting, conference call or task. In one implementation, one or more records 501 in the set of device activity information 22 or 234 is identified by the device activity module 14 or 290 with a user activity state 520 which provides a user mode or metadata in the electronic device 10 or 100 to indicate a state of predicted activity. In one implementation, the set of device activity information 234 also contains predicted activation states for the components 20 which have been generated as described below.

Exemplary component data includes the activation state of the component 20, an operational status of the component 20, one or more entries of data generated or provided by the component 20, one or more attribute settings for the component 20 or a combination of activation states, operational status, data, and attribute settings. Component data provides data about the environment, location or activity, or a combination thereof, of the electronic device 10 or 100. Component data may include, for example, a measurement of ambient temperature from the temperature sensor, a measurement of the level of ambient light from the ambient light sensor 140, a GPS location from the GPS subsystem 266, a cell network area or a received signal strength indicator (RSSI) from the cellular communications subsystem 250, a compass heading from a magnetometer, a change in activation state from disabled to enabled of a IP communications subsystem 260, or an acceleration of the electronic device 100 measured by the accelerometer.

Component data is gathered by the device activity module 14 or 290 by periodic sampling of components 20 in the electronic device 10 or 100, by registering changes in activation states or by registering changes in operational status. Changes in activation states or changes in operational status may be communicated to the device activity module 14 or 290 by components 20 or by the controller 12 in electronic device 10, or the processor 200 in electronic device 100. In one implementation, component data is sampled at a high rate initially and the sampling rate is decreased as a pattern of device activity is established in the set of device activity information 22 or 234. A time associated with the sampled component data, the change in activation state or the operational status may be stored in the device activity record.

The device activity module 290 and the set of device activity information 234 may be configured by a user of the electronic device 100 through a GUI provided by the device activity module 290 and user interface module 283. The set of device activity information 22 or 234 is maintained over a predetermined time period, such as a one week period, which may be set by a user of the electronic device 10 or 100. The predetermined time period may be set by a user to cover a day, a typical 7-day week, or to cover a user's specific shift schedule, such as a 10-day or 14-day shift rotation.

One or more sets of device activity information 22 or 234 may be maintained by the device activity module 14 or 290 for the same predetermined time period or for different predetermined time periods. For example, a first set of device activity information 22 or 234 is maintained and used by the device activity module 14 or 290 as configured by a user for the user's typical 7-day week while working. A second set of device activity information 22 or 234 is maintained and used by the device activity module 14 or 290 as configured by a user for a 10-day vacation period. In one implementation, the applicable set of device activity information 22 or 234 is selected by the user. Alternatively, one or more sets of device activity information 22 or 234 are maintained by the device activity module 14 or 290 and the applicable set of device activity information 22 or 234 is determined by the device activity module 14 or 290.

At action 410, a current time is determined. The current time may be determined from a variety of sources such as the clock module 287; the cellular communications subsystem 250; the GPS subsystem 266; or other device subsystems 240 in the electronic device 100 or from the clock 16 in the electronic device 10.

At action 415, current component data is collected from one or more components 20 in the electronic device 10 or 100. Current component data may be gathered by the device activity module 14 or 290 by sampling of components 20 on the electronic device 10 or 100 or by collecting changes in activation states or changes in operational status which may be communicated to the device activity module 14 or 290 by components 20, the controller 12, the processor 200 or by a combination of components 20, and the controller 12 or processor 200. The collecting of current component data may be performed on a periodic basis, prompted by a change in the activation state of a component 20, or prompted by a change in the operational status of a component 20 in the electronic device 10 or 100.

Current component data includes the current activation state of one or more components 20, the operational status of the component 20 or one or more entries of current data about the environment, location or activity generated or provided by the component, one or more attribute settings for the component 20, or a combination thereof, of the electronic device 10 or 100. Current component data may include, for example, a measurement of the current ambient temperature from the temperature sensor, a measurement of the current level of ambient light from the ambient light sensor 140, a current GPS location from the GPS subsystem 266, a current cell network area or a current received signal strength indicator (RSSI) from the cellular communications subsystem 250, a current compass heading from a magnetometer or a current acceleration of the electronic device 100 measured by the accelerometer.

At action 420, device activity is predicted by the device activity module 14 or 290 based on the current time, current component data and the component data maintained in the set of device activity information, such as the set of device activity information 22 or 234 described with reference to FIG. 5. Device activity is predicted for an anticipated decision point or time at which the predicted activation state, attribute setting or combination of activation state and attribute settings for the component 20 are determined to apply. Predicting of device activity at 420 includes an identification of one or more components 20 which are likely to be used by other components 20 in the electronic device 10 or 100, including modules 280 or subsystems in the electronic device 100, or by a user of the electronic device 10 or 100 and which may be set to a predicted activation state of standby or enabled at a predetermined time prior to the anticipated decision point. Predicting of device activity also may include an identification of one or more components 20 which are likely to be unused and can be set to a predicted activation state such as disabled, standby or a lower power state.

In predicting device activity, the component data in the device activity information record for a time corresponding to the current time is used. Alternatively, or in addition to records for the current time, a number of records in the set of device activity information 22 or 234 for times before, or after, or both before and after the current time are analyzed to identify a sequence or pattern of device activity. In one implementation, component data such as a change in the activation state of a lower-power component 20 is used to predict a change in the activation state of a higher-power component 20. In another implementation, device activity is predicted based on a match between the current time, current component data and the component data maintained in the set of device activity formation 22 or 234. Device activity also may be predicted based on the detection of a break from the established pattern of device activity maintained in the set of device activity information 22 or 234. In another implementation, device activity is predicted based on the current time, current component data and the device activity information records including data regarding scheduled events. Data regarding scheduled events may be obtained from the calendar module 285, the event scheduler 286 or the event records 235, or from a combination thereof.

At action 425, based on the predicted device activity a predicted activation state of one or more components 20 is generated. Generating the predicted activation state consists of determining an appropriate activation state for one or more components as one of an enabled, disabled, idle or standby activation state. Generating the predicted activation state may not necessarily indicate a change in activation state if the current activation state of the component 20 is the same as the predicted activation state.

The method 400 may further comprise the action of setting of the activation state of the component 20 to the predicted activation state at a predetermined time prior to the anticipated decision point. The activation state of the component 20 is set at the predetermined time prior to the anticipated decision point to account for latency between, for example, setting of the activation state to enabled and the component 20 being enabled as indicated by the operational status. Setting of the activation state may not result in a change of the activation state of the component. For example, if the component 20 is currently enabled and in use by another component 20, such as a module 280 or subsystem in the electronic device 100, it may not be desirable to set the component 20 to a predicted activation state of disabled. Priorities for setting the activation states of one or more components 20 may be assigned to components 20, including priorities for the device activity module 14 or 290, or for subsystems and software modules 280 in the electronic device 100. Thus, predicted activation states from the device activity module 14 or 290 are not implemented if the request from the device activity module 14 or 290 has a lower priority than requests from other components 20.

The action 420 of predicting device activity also may be based on a record of past success of predicted device activity and predicted activation states generated for the component 20. The success of predicted device activity and predicted activation states may be determined by the device activity module 14 or controller 12. Success may be determined based on a match between a predicted activation state and the operational status, the activation state or a combination of the operational status and activation state of the component 20 at the anticipated decision point. For example, success may be determined where a component 20 was predicted to be in use and in an enabled activation state at the anticipated decision point and the actual activation state and the operational status are enabled at the decision point. Success may be determined not to occur if, for example, a predicted activation state is an enabled state for the anticipated decision point but the actual activation state is disabled at the anticipated decision point. Such lack of success may be due to incorrectly predicting device activity or where a higher priority component has set the activation state of the component 20 to a disabled state.

Where the method 400 includes setting the activation state of the component 20 according to the predicted activation state, the record of past success also depends on the predetermined time at which an activation state of the component 20 is set. Success may be determined not to occur if, for example, a predicted activation state is an enabled state for the anticipated decision point but the operational status of component 20 is not fully enabled at the anticipated decision point. Such lack of success may be due to setting the activation state of the component 20 to the predicted activation state at the predetermined time close to the anticipated decision point such that changes in the operational status of the component 20 are not complete in time for use of the component 20 by the electronic device 10 or 100. This case may occur for components 20 with a longer latency for changes ire activation states to occur, such as satellite based components including the GPS subsystem 266. Where the predicted device activity is based on a record of past success of predicted device activity and predicted activation states, and the record indicates a lack of success due to an incorrect timing and setting of the activation state of the component 20 at the predetermined time prior to e anticipated decision point, setting of the activation state may be performed at an earlier time prior to the decision point in order to increase the probability of success. Lack of success also may be determined where an activation state is set to a predicted activation state at a time much earlier than the anticipated decision point such that a component 20 is, for example, enabled and requiring power for a longer duration and when not in use by the electronic device 10 or 100.

In one implementation, one or both of the actions of generating a predicted activation state 425 or setting the activation state of the component also is based on the set of device activity information 234 and component data including the operational status of the component 20. For example, the predicted device activity may indicate that the GPS subsystem 266 should be set to an enabled activation state to provide GPS data about the location of the electronic device 100. Based on the set of device activity information 234 providing a pattern of component data including a current network location from the IP communications subsystem 260 and operational status of the GPS subsystem 266 being disabled, the predicted activation state for the GPS subsystem 266 may be generated as a disabled state since the set of device activity information 234 indicates that the GPS subsystem 266 has not been operational in the current network location. Alternatively, setting of the activation state of the GPS subsystem 266 to a predicted activation state of enabled may not be implemented based on the set of device activity information 234 providing a pattern of component data including a current network location from the IP communications subsystem 260 and operational status of the GPS subsystem 266 being disabled. In one implementation, generating the predicted activation state 425 or setting the activation state of the GPS subsystem 266 to an enabled activation state is delayed until a condition is met, such as component data from the IP communications subsystem 260 indicating that the electronic device 100 is in a new network location such that setting of the GPS subsystem 266 to an enabled activation state will succeed or is more likely to succeed. Power consumption in the electronic device 10 or 100 is managed by reducing attempts to change a component 20 to an enabled activation state when the set of device activity information 234 indicates that attempts to change the component 20 to an enabled activation state have failed in the past for the pattern of device activity and component data, such as a network location.

In one implementation, device activity is predicted at action 420 based on a match between the current time, current component data and the component data maintained in the set of device activity information 234. For example, the set of device activity information 234 may indicate a pattern of component data including the location of the device equaling the user's home, and a change by a user of the activation state of an IP communications subsystem 260 from disabled to enabled at a specific time period each day, such as between the hours of 5:00 and 6:00 PM. Based on a current time being between the hours of 5:00 and 6:00 PM, and current component data indicating the current location of the electronic device 100 is at the user's home, the predicted device activity includes the use of the IP communications subsystem 260 and the predicted activation state of the IP communications subsystem 260 is determined to be enabled. The device activity module 290 may set the IP communications subsystem 260 to an enabled activation state at action 425 based on the pattern in the set of device activity information 234.

In one implementation, device activity is predicted at action 420 based on the detection of a break in routine from the established pattern of device activity maintained in the set of device activity information 234. For example, the set of device activity information 234 may indicate a pattern of component data including the electronic device 100 being in motion or moving at a certain rate, and the location of the electronic device 100 being in a specific cell area sampled from the cellular communications subsystem 250 at a specific time each day such as 7:30AM. Based on a current time being 7:30AM, current component data indicating that the electronic device 100 is in motion or moving at a rate above a specified threshold, and the current location of the electronic device 100 being in a current cell area different from the cell area location in the device activity information record, device activity is predicted to benefit from the use of the GPS communications subsystem 266 for location and navigation functions. The activation state of the GPS communications subsystem 266 is predicted to be enabled activation state at action 425 by the device activity module 290. The GPS communications subsystem 266 may be set to the enabled activation state to support functions on the electronic device 100, such as the map module 289, which may be used when the electronic device 100 is in an unknown o different location.

In one implementation, the set of device activity information 234 includes data regarding scheduled events, such as event data obtained from the calendar module 285, the event scheduler 286 or the event records 235, of a scheduled time and a scheduled location of an appointment, meeting, conference call or task. Device activity is predicted at action 420 based on the current time, current component data and the device activity information records, including data regarding scheduled events. The component data in the device activity information record for a time corresponding to the current time may be used. Alternatively, or in addition, a number of records in the set of device activity information 234 for tunes before, or after, or both before and after the current time are analyzed to identify a scheduled event. For example, the set of device activity information 2 34 may indicate a meeting is scheduled in the electronic device 100 for a scheduled time in the future, such as 10:00AM, and at a scheduled location, such as the 20$^{th}$ floor of a building at location "X". Based on a current time being 9:55AM, current component data indicating that the electronic device 100 is in motion or moving at a rate above a specified threshold and the current location of the electronic device 100 being near building location X (based on current sensor data obtained from the GPS subsystem 266 or based on the detection of a wireless IP network by the IP communications subsystem 260), device activity is predicted to use the functions of the NFC communications subsystem 268 to obtain data regarding the building and meeting location from a tag in a building floor plan or sign providing meeting data. The NFC communications subsystem 268 is predicted to be in an enabled activation state at action 425 by the device activity module 290. The activation state of the NFC communications subsystem 268 is set to enabled prior to the use of the NFC communications subsystem 268 in the electronic device 100 to allow a user to obtain data regarding the meeting. Subsequently, based on a current time of 10:05, and current component data indicating the electronic device 100 is not in motion and is at the building location X, the device activity module 290 may predict and set the NFC communications subsystem 268 to a disabled activation state.

In one implementation, the device activity information records include data regarding attribute settings for one or more components 20 and the predicting of device activity includes predicting a setting of an attribute for a component 20. For example, a sampling rate attribute of an accelerometer may be predicted based on a specific function being performed by the electronic device 100. An RF protocol type attribute, such as 14443 Type A, for the NFC subsystem 268 may be predicted based on the location of the electronic device 100. As a further example, the NFC subsystem 268 may operate in a card emulation mode to enable use of the electronic device 100 with external payment systems. The card emulation mode may include an account attribute which allows the use of either a first credit card account or a second credit card account to effect a financial transaction. A user may prefer the use of the first credit card account in some situations, such as for payment at a gas station, in order to collect points or rewards associated with the use of the first credit card account at gas stations.

In one implementation, device activity and component attribute settings may be predicted at action 420 based on a match between current component data and the component data maintained in the set of device activity information 234. For example, the device activity information record may include component data such as the location of the device equaling a gas station, a change in activation state by a user of the NFC subsystem 268 from disabled to enabled, and an attribute setting for the NFC subsystem 268 equal to a first credit card account. Based on current component data indicating that the device location is a gas station, the predicted device activity may include the activation of the NFC subsystem 268. Thus, the NFC subsystem 268 may be set to an enabled activation state by the device activity module 290. Further, based on the current component data indicating that the device location is a gas station, the predicted attribute of the NFC subsystem 268 may be set to first credit card account. Thus, user input to select an account attribute is not required and latency to enable the NFC subsystem 268 and set attributes of the NFC subsystem is less noticeable to a user.

As a further example, the set of device activity information 234 may indicate that a meeting in the building at location X is scheduled to end at 11:00AM. Based on a current time being 10:55AM and current component 20 data indicating that the electronic device 100 is in motion, as indicated by dynamic movements measured by the accelerometer, and that the electronic device 100 is at the first floor of the building at location X, as indicated by measurements from the altimeter, device activity may be predicted to use the access control functions of the NFC communications subsystem 268 to exit through security at the building at location X. An attribute as the operating mode of the NFC communication subsystem 268 may be predicted to be in a card-emulation mode to support the use of the electronic device 100 for vicinity card access functions to exit the building security. The activation state of the NFC communications subsystem 268 is predicted by the device activity module 290 to be in a standby state in order to support the card-emulation mode. The NFC communications subsystem 268 is set to a standby activation and in a card-emulation mode prior to its use to allow a user to exit the building. The activation state of the NFC communications subsystem 268 is disabled during the scheduled meeting to reduce power consumption by the NFC subsystem 268 and then set to a standby state on a just in time basis to ensure the NFC communications subsystem 268 is operable when predicted to be in use by the electronic device 100.

The method 400 may further comprise storing the predicted activation states for one or more components 20 in the memory 18 of the electronic device 10 or in persistent memory, such as flash memory 233 of the electronic device 100. The predicted activation states may be stored as part of the set of device activity information 234 or as a separate set of predicted activity information (not shown). The set of predicted activity information may be generated by the device activity module 14 or 290 or by the processor 200. The set of predicted activity information includes records of predicted activation states for one or more components 20 in the electronic device 10 or 100 generated according to the present disclosure. The set of predicted activity information may include a time of day and day of week along with the predicted activation states. In one implementation, the set of predicted activity information includes predicted attribute settings for one or more components 20.

In one implementation, the action 425 of generating the predicted activation state is based on the predicted device activity and one or more records of predicted activation states in the set of predicted activity information for the current time, a time before or a time after the current time, or a combination of the current time and times before and after the current time. Generating the predicted activation state may not indicate a change in activation state, such as a change from an enabled to a disabled state, if a subsequent predicted activation state in the predicted activity information record of the component 20 being in an enabled state is within a predetermined time period. For components 20 which require considerable power or which incur delay to implement a change in an activation state, such as the GPS subsystem 266 or communications subsystems 210, power and latency may be managed by generating the predicted activation state as an enabled state to avoid cycling the component 20 through multiple changes in activation states or through brief periods of being in a disabled activation state.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware circuits, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various implementations presented above are merely examples and are in no way meant to limit the scope of this disclosure. Variations of the innovations described herein will be apparent to persons of ordinary skill in the art, such variations being within the intended scope of the present application. In particular, features from one or more of the above-described implementations may be selected to create alternative implementations comprised of a sub-combination of features which may not be explicitly described above. In addition, features from one or more of the above-described implementations may be selected and combined to create alternative implementations comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed:

1. A method of generating predicted activation states of components in an electronic device, comprising:
    detecting a break from an established pattern of device activity based on current component data and device activity information records, the break comprising a change between a current device location and a device location in the device activity information records;
    predicting device activity based on the detected break from the established pattern of device activity; and
    in response to the predicted device activity, generating a predicted activation state of at least one component in the electronic device.

2. The method of claim 1 further comprising setting an activation state of the at least one component to the predicted activation state.

3. The method of claim 1 further comprising generating a predicted attribute setting for an attribute of the at least one component and setting the attribute of the at least one component to the predicted attribute setting.

4. The method of claim 1 wherein both the device location and the current device location comprise a global positioning system (GPS) location or a cellular communications network cell area.

5. The method of claim 1 wherein generating the predicted activation state of at least one component comprises generating a predicted activation state of a GPS subsystem as one of an enabled, idle, standby and disabled activation state.

6. The method of claim 1 further comprising maintaining a set of device activity information in a memory, the set of device activity information including records of component data from a plurality of components in the electronic device at associated times.

7. The method of claim 6 wherein maintaining the set of device activity information includes storing the set of device activity information in a memory of the electronic device.

8. The method of claim 6 wherein the set of device activity information is maintained over a predetermined time period.

9. The method of claim 8 wherein the predetermined time period is a week, the associated times include days of the week and times of day, and the current time includes a current day of the week and a current time of day.

10. The method of claim 6 wherein a first set of device activity information is maintained for a first predetermined time period and a second set of device activity information is maintained for a second predetermined time period.

11. The method of claim 6 wherein maintaining the set of device activity information further comprises collecting component data from the plurality of components on a periodic basis.

12. The method of claim 6 wherein the plurality of components comprises one or more of an ambient light sensor, a temperature sensor, a tilt sensor, an accelerometer, an altimeter, a capacitive touch sensor, a global positioning system (GPS) subsystem, a pedometer, a force sensor, a magnetometer, a gyroscope, a cellular communications subsystem, an internet protocol (IP) communications subsystem, a touchscreen display and a near field communications (NFC) subsystem.

13. The method of claim 6 further comprising collecting current component data from the plurality of components, the current component data being associated with a current time, the current component data including the current device location.

14. The method of claim 13 wherein the component data and current component data include changes in state of the plurality of components.

15. The method of claim 13 wherein the current device location comprises a first cell area of a cellular communications network, the device location in the device activity information records associated with the current time comprises a second cell area of a cellular communications network and wherein the first cell area is different from the second cell area.

16. The method of claim 1 wherein the set of device activity information includes a scheduled time and a scheduled location of one or more events.

17. An electronic device comprising:
a controller for controlling operation of the electronic device;
a clock;
a plurality of components;
a memory connected to the controller; and
the controller being configured to:
detect a break from an established pattern of device activity based on current component data and device activity information records wherein the break comprises a change between a current device location and a device location in the device activity information records;
predict device activity based on the detected break from the established pattern of device activity; and
in response to the predicted device activity, generate a predicted activation state of at least one component in the electronic device.

18. The electronic device of claim 17 wherein the controller is further configured to maintain a set of device activity information in the memory of the electronic device, the set of device activity information including records of component data from the plurality of components in the electronic device at associated times.

19. The electronic device of claim 18 wherein the controller is further configured to collect current component data from the plurality of components, the current component data being associated with a current time, the current component data including the current device location.

20. The electronic device of claim 17 wherein the plurality of components comprises one or more of an ambient light sensor, a temperature sensor, a tilt sensor, an accelerometer, an altimeter, a capacitive touch sensor, a global positioning system (GPS) subsystem, a pedometer, a force sensor, a magnetometer, a gyroscope, a cellular communications subsystem, an internet protocol (IP) communications subsystem, a touchscreen display and a near field communications (NFC) subsystem.

21. The electronic device of claim 17 wherein the electronic device is a mobile device.

22. A non-transitory computer-readable storage medium in an electronic device having a plurality of components, the medium having stored thereon computer-readable and computer-executable instructions, which, when executed by a controller, cause the electronic device to perform actions comprising:
detecting a break from an established pattern of device activity based on current component data and device activity information records, the break comprising a change between a current device location and a device location in the device activity information records;
predicting device activity based on the detected break from the established pattern of device activity; and
in response to the predicted device activity, generating a predicted activation state of at least one component in the electronic device.

23. The non-transitory computer-readable storage medium of claim 22 wherein the actions further comprise maintaining a set of device activity information in a memory of the device, the set of device activity information including records of component data from the plurality of components in the electronic device at associated times.

24. The non-transitory computer-readable storage medium of claim 23 wherein the actions further comprise collecting current component data from the plurality of components, the current component data being associated with a current time, the current component data including the current device location.

* * * * *